United States Patent [19]

Canaday et al.

[11] Patent Number: 4,760,099

[45] Date of Patent: Jul. 26, 1988

[54] STABILIZER-CONTAINING POLYOL COMPOSITIONS FOR POLYURETHANE AND POLYISOCYANURATE FOAMS

[75] Inventors: John S. Canaday, Tampa; Michael J. Skowronski; Michael E. Londrigan, both of Clearwater, all of Fla.

[73] Assignee: Sloss Industries Corporation, Birmingham, Ala.

[21] Appl. No.: 945,435

[22] Filed: Dec. 22, 1986

[51] Int. Cl.$^4$ ............................................. C08G 18/30
[52] U.S. Cl. ..................................... 521/110; 521/125; 521/128; 521/130; 521/137; 524/399; 524/400; 524/736; 524/777; 524/783
[58] Field of Search ............. 521/110, 125, 128, 130, 521/137; 524/399, 400, 736, 777, 783

[56] References Cited

U.S. PATENT DOCUMENTS

| | | | |
|---|---|---|---|
| 3,183,192 | 5/1965 | Bauer | 252/188.3 |
| 3,352,789 | 11/1967 | Degginger et al. | 252/171 |
| 3,378,497 | 4/1968 | Lanham | 252/182 |
| 3,583,926 | 6/1971 | Zwolinski et al. | 252/182 |
| 3,945,939 | 3/1976 | Barron | 252/182 |
| 4,029,593 | 6/1977 | Schapel et al. | 252/182 |
| 4,107,069 | 8/1978 | Keller et al. | 252/182 |
| 4,115,300 | 9/1978 | Chakirof | 521/171 |
| 4,239,642 | 12/1980 | DePaul et al. | 252/182 |
| 4,312,963 | 1/1982 | Chandalia et al. | 525/56 |
| 4,401,779 | 8/1983 | Bae et al. | 524/114 |
| 4,436,841 | 3/1984 | Rasshofer et al. | 521/106 |
| 4,575,518 | 3/1986 | Rasshofer et al. | 521/51 |
| 4,576,731 | 3/1986 | Rieck | 252/182 |

OTHER PUBLICATIONS

Dwyer, F. J., Zwolinski, L. M., Garman, J. M., Brown, D., "Storage Stability of CFC/Polyol Premixes," Allied Corporation, Fluorine Products Division.

DeGuiseppi, D. T., "Reaction Instability of Rigid Foam Systems Containing Polyester Polyols," Proceedings: Society of Plastics Industry, 29th Tech. Conf., pp. 84-90, Oct. 23-25, 1985.

*Primary Examiner*—John Kight
*Assistant Examiner*—S. A. Acquah
*Attorney, Agent, or Firm*—James W. Grace; Charles W. Vanecek

[57] ABSTRACT

A storage-stable premix composition for use in a foam-forming reaction with an organic polyisocyanate in the manufacture of a polyurethane or polyisocyanurate foam comprising
  (a) at least one polyol,
  (b) at least one halogenated organic blowing agent,
  (c) at least one amine catalyst, and
  (d) a stabilizing amount of at least one polyvalent metal-containing organometallic compound.

Some organometallic compounds of the invention have a slight catalytic effect but do not have the pronounced activity of conventional urethane and isocyanurate catalysts such as dibutyltin dilaurate and stannous octoate.

23 Claims, No Drawings

STABILIZER-CONTAINING POLYOL COMPOSITIONS FOR POLYURETHANE AND POLYISOCYANURATE FOAMS

BACKGROUND OF THE INVENTION

1. Field of the Invention

This invention relates to the stabilization of chlorofluorocarbon/polyester polyol premixes, and the use of such premixes for the preparation of polyurethane and polyisocyanurate foams.

2. Description of the Prior Art

The use of foamed polyurethanes and polyisocyanurates as thermal insulating materials, packaging foams, etc. is widespread. It is common practice in the manufacture of such cellular foam materials to mix two preformulated components, commonly called the A-component and the B-component. Typically, the A-component contains the isocyanate compound that must be reacted with the constituents of the B-component premix to form the foam, and this B-component premix commonly contains the balance of the foam ingredients, namely, polyol, blowing agent, which is normally a chlorofluorocarbon (e.g., $CCl_3F$, CFC-11), surfactant and catalyst.

An inexpensive source of polyols for foam insulation systems is now available through the use of waste stream aromatic polyesters and aromatic polyesters reclaimed from bottles, film scrap, etc. Unfortunately, premixes containing these polyester polyols are unstable with regard to reactivity at room or elevated temperature when such premixes also contain an amine catalyst. Apparently, acid formed as a product of CFC-11/polyol reactions affects the efficiency of the amine catalyst. The result is a loss of reactivity of the premix. Furthermore, when the stored polyol premixes are employed in the preparation of polyurethane and polyisocyanurate cellular materials, there may result a degradation in foam cell structure and color.

Therefore, there is a need for simple and inexpensive ways of providing storage-stable premixes containing polyester polyols for the preparation of polyurethane and polyisocyanurate foam articles.

OBJECTS OF THE INVENTION

It is accordingly an object of the present invention to provide a storage-stable blend of polyester polyol, especially aromatic polyester polyol, halogenated hydrocarbon blowing agent, amine catalyst and stabilizing component.

It is another object of the present invention to provide for use of the storage-stable blend in producing polyisocyanurate and polyurethane foams having a combination of advantageous properties, including a reduced friability, and high thermal resistance, compressive strength, and dimensional stability.

It is a further object of the present invention to provide improved rigid cellular foams, especially polyisocyanurate and polyurethane foams, having a combination of advantageous properties, including a reduced friability, and high thermal resistance, compressive strength, and insulation properties, and an improved method of producing the foams.

It is an additional object of the present invention to produce an improved rigid polyisocyanurate foam material characterized by a high degree of fire resistance with low smoke evolution and flame spread on combustion, and the formation of a protective char over unburnt foam upon combustion.

It is a still further object of the present invention to provide closed cell polyisocyanurate and polyurethane foam materials which can be used in building panels which are highly insulating, thermally resistant, low in friability, soundproof and self-supporting.

These and other objects and advantages of the present invention will become more apparent by reference to the following specification and appended claims.

DESCRIPTION OF THE INVENTION

The above objects have been achieved and the drawbacks of the prior art have been overcome by the development of stabilizer-containing polyol compositions which are suitable for making polyurethane and polyisocyanurate foams. It has been found that the premature deactivation of amine catalyst contained in the premix for rigid polyurethane and polyisocyanurate foams in the presence of halogenated hydrocarbon blowing agents can be reduced or largely avoided and the useful storage life of such premix extended by inclusion therein of a stabilizing amount of at least one organometallic compound, which desirably comprises a polyvalent metal-containing complex or salt.

The organometallic compounds employed as stabilizing components of the polyol compositions of the present invention are those that are conventionally used as acid scavengers in vinyl polymer compositions. Although various organo-metal compounds have been heretofore employed as catalysts in polyurethane and polyisocyanurate forming reactions, it has not hitherto been proposed to use vinyl acid scavengers for preserving the catalytic activity of amine-containing polyester polyol formulations. Thus, the invention provides a stabilized composition which comprises a polyol, preferably a polyester polyol, a halogenated hydrocarbon blowing agent, an amine catalyst and a stabilizing organometallic compound. The preferred polyester polyol premixes optionally contain polyether polyols.

Examples of the conventional acid scavengers that are used in vinyl chloride compositions and that may be used to advantage in the present invention are polyvalent metal compounds containing organic components, particularly the soaps and phenolates. The compounds thus include calcium, strontium and barium salts of organic acids, such as those containing about 6 to 22 carbon atoms, as, for instance, the 2-ethylhexanoate, laurate, stearate, ricinoleate, neodecanoate, naphthenate or oleate salts; and corresponding cadmium, zinc and lead salts of the organic acids, preferably in conjunction with the alkaline earth metal salts of the kinds stated. Preferred stabilizing additives include one or more organometallic compounds whose metals are from Groups II and IIB of the Periodic Table. Barium and cadmium salts and mixtures thereof are especially useful. Stabilizing polyvalent metal salts of the invention are described in U.S. Pat. Nos. 2,564,646, 2,716,092 and 4,401,779, the disclosures of which patents are hereby incorporated by reference.

In a preferred embodiment, the invention comprises polyol compositions containing as stabilizing component a polyvalent metal salt or salts, e.g., the alkaline earth metals, such as barium, strontium and calcium, of a substituted phenol. Hydrocarbon-substituted phenols are preferred. Alternative metals are cadmium, zinc and lead. In other preferred embodiments, the invention comprises such polyvalent metal salt in conjunction with a water insoluble polyvalent metal salt of a fatty acid, the mixture of the two materials advantageously containing both barium and cadmium in the polyvalent metal component. The fatty acid salt of the polyvalent metal may be selected from those described in above-cited U.S. Pat. No. 2,564,646.

Highly useful stabilizers are barium and cadmium substituted phenolates and mixtures thereof or such a mixture as that of barium alkylphenolate with a cadmium carboxylate, such as a cadmium salt of a fatty acid containing 6–18 carbon atoms to the molecule, examples of such salt being cadmium 2-ethylhexoate, cadmium laurate and cadmium stearate.

One preferred liquid stabilizer system for stabilizing the polyol compositions of the invention is based on two essential stabilizers: (1) a liquid barium carbonate-barium alkyl phenate and (2) a cadmium carboxylate. The cadmium carboxylate desirably is a salt of a branched chain aliphatic carboxylic acid having from about eight to ten carbon atoms, or a mixture of at least 85% thereof with up to 15% of a carboxylic acid selected from the group consisting of (a) aromatio carboxylic acids having from about seven to about eleven carbon atoms; and (b) unsaturated and saturated straight chain aliphatic carboxylic acids having from about nine to about twenty-two carbon atoms.

In particularly useful stabilizing compositions of this type, the sum of the weight percent of barium and of cadmium is at least 18%, and the ratio of the weight percent of cadmium to the weight percent of barium is within the range from about 0.4:1 to about 1.2:1. This liquid stabilizer is described in U.S. Pat. No. 4,401,779.

Other preferred organometallic compositions are the so-called "overbased" compositions wherein the ratio of total metal contained therein to the organic moiety is greater than the stoichiometric ratio of the neutral organic salt, i.e., the number of metal equivalents is greater than the number of equivalents of the acid residue. Overbased barium salt complexes are described in U.S. Pat. No. 4,159,973 and the patents cited therein, the disclosures of which patents with respect to these complexes are incorporated herein by reference. Liquid barium carbonate-organic salt compositions exemplify such materials. A particularly suitable stabilizer is a liquid barium carbonate-barium alkyl phenate, which is described in U.S. Pat. No. 4,401,779. Especially good results have been obtained using as stabilizer an overbased barium carboxylate (34.0% Ba) or an overbased barium nonylphenate-cadmium 2-ethyl hexanoate combination (17.5% Ba and 6.8% Cd), which are supplied by Argus Chemical Corp. under the trade names Mark 4086 and Mark 7178, respectively.

The cations of the stabilizing compounds are advantageously present in a combined form, e.g., as a salt, complex and the like, which is soluble in the polyol premix component (B-Side) of the invention. Solid stabilizing salts may be used after solubilization but they are less desirable because of difficulties associated with solubilizing the solids. Some stabilizers of the invention, particularly certain liquids, have been found to have a catalytic effect in the foaming reactions. The "overbased" metal salts described above can be used to diminish or eliminate the catalytic activity of the stabilizing component. Highly overbased barium salts are particularly advantageous. Because of the catalytic effect plus other factors, such as the nature of the precise overall foam system used, the properties desired in the ultimate product, the temperature at which the foam is created, and the like, the type and amount of stabilizing compound which is employed for a specific system will, of course, vary.

The appropriate stabilizer and amount thereof can, in any event, be readily determined through routine experimentation. An appropriate acid scavenging organometallic compound or mixture of compounds for a particular premix formulation is one whose use gives rise to significantly less and preferably little or no lengthening in foam gel time for the aged premix as compared to use of the corresponding aged premix formulation without the stabilizing compound or compound mixture. The foaming comparison of stabilized versus unstabilized premixes may appropriately be conducted after aging each in a sealed container for 10 days at 55° C. Use of the stabilizers of the invention will desirably result in a gel time after storage which is less than, substantially the same as or no more than approximately 25% and more preferably no more than approximately 15% greater than the initial gel time of the unstabilized premix formulation. The most preferred stabilizers provide a gel time for the aged premix which is substantially the same as or no more than approximately 10% greater or less than the gel time of the unstabilized formulation. Typically, the stabilizers of the invention will preserve the reactivity of premix formulations under storage at ambient conditions for more than 30, preferably 60, and more preferably 180 days.

While some stabilizing compounds of the invention may have a catalytic effect on the premix formulation, it is desirable that these stabilizing compounds do not catalytically shorten the initial gel time of the unstabilized premix formulation in the manner of well-known metal catalysts such as stannous octoate and cobalt octoate. In the publication entitled "Reaction Instability of Rigid Foam Systems Containing Polyester Polyols" of D. T. DeGuiseppi (Proceedings: Society of Plastics Industry, 29th Tech. Conf., Oct. 23–25, 1985), a "model" foam system is described for investigating the reaction instability of polyester polyol based liquid foam systems. When included at a level of about 1000 ppm, based on the parts by weight of the polyester polyol, in the B-component of the "model" foam system of DeGuiseppi, the stabilizing organometallic compounds of the present invention do not catalytically shorten by more than about 40, preferably 30 and more preferably 20% the initial gel time of the foam-forming ingredients of this model system. Specifically, the "model" foam system of DeGuiseppi, shown in the following Table, is based on a 100 percent polyester polyol—having an equivalent weight of about 110 to 250 and a functionality of about 2.1 to 3.0—which is catalyzed to a 40–60 second gel time using various levels of catalyst. A 15 percent level of fluorocarbon is included in the "B" component which is reacted in a handmix at a 1.10 index using the isocyanate.

TABLE

Model Foam System

| Component | Parts by Weight | Type | Example |
|---|---|---|---|
| A. Isocyanate | (1.10 Index) | Polymethylene Polyphenylisocyanate | PAPI ® 27 (133.5 isocyanate equivalent) |
| B. Polyester Polyol | 100.0 | Polyester Polyol produced from DMT bottoms, DMT or recycled PET | |
| Surfactant | 1.5 | Silicone Surfactant | L-5420 |
| Catalyst | 0.24–2.75 | Amine Catalyst | N,N—Dimethylcyclohexylamine Triethylamine N,N,N', N' Tetramethyl-1; 3-Butanediamine, N—Ethylmorpholine, N,N—Dimethylethanolamine, N—Methyl-Pyrrolidinone, Dabco-33LV, C-178, A-48875, TMR-2, TMR-30, Polycat 41 |
| Blowing Agent | 15.0 | Fluorocarbon | Freon-11 |
| Stabilizer | 0.1 | α-Methyl Styrene | |

The term "model foam," as used in the appended claims, refers to the resultant foam of the "model" foam system described above and in the DeGuiseppi publication, which is hereby incorporated by reference.

The stabilizer α-methyl styrene listed in the above Table is commonly incorporated in the fluorocarbon blowing agent but, as disclosed in the DeGuiseppi publication, does not preserve the reactivity of the rigid foam system with aging.

The organometallic stabilizers are employed in stabilizing amounts sufficient to prevent the polyol compositions of the invention from losing reactivity on standing for extended periods. For example, the stabilizers can be employed in quantities of from about 0.5 weight percent to about 15 weight percent, based on the weight of polyol. More preferably, the stabilizers are employed in quantities of from about 0.5 to about 1.5 weight percent, based on the weight of polyol.

The stabilized blends of the invention advantageously contain from about 15 to 95, preferably 50 to 85, weight % of the polyol component. This component advantageously comprises polyester polyols or mixtures of polyester and polyether polyols. The polyol component of the blend typically comprises from about 10 to 100, more preferably 30 to 100, and most preferably 50 to 100 weight percent of at least one polyester polyol (especially an aromatic polyester polyol), and from about 90 to 0, more preferably 70 to 0, and most preferably 50 to 0 weight percent of at least one other polyol (especially a polyether polyol).

The polyester polyols include, for example, reaction products of polyhydric alcohols with polybasic carboxylic acids. The alcohols and/or the acids may, of course, be used as mixtures of two or more compounds in the preparation of the polyester polyols. In lieu of the free polycarboxylic acids, the corresponding polycarboxylic acid anhydrides or corresponding polycarboxylic acid esters or mixtures thereof may be used.

The polyester polyols generally have hydroxyl numbers ranging from about 100 to 700, preferably from about 100 to 400, and have an average functionality of from about 1 to 8, and more preferably from about 2 to 3.

In the production of the polyester polyols, the polycarboxylic acids may be aliphatic, cycloaliphatic, aromatic and/or heterocyclic and may optionally be substituted, for example, by halogen atoms, and/or may be unsaturated. Examples of suitable carboxylic acids and derivatives thereof for the preparation of the polyester polyols include: oxalic acid; malonic acid; succinic acid; glutaric acid; adipic acid; pimelic acid; suberic acid; azelaic acid; sebacic acid; phthalic acid; isophthalic acid; trimellitic acid; terephthalic acid; phthalic acid anhydride; tetrahydrophthalic acid anhydride; hexahydrophthalic acid anhydride; tetrachlorophthalic acid anhydride; endomethylene tetrahydrophthalic acid anhydride; glutaric acid anhydride; maleic acid; maleic acid anhydride; fumaric acid; dibasic and tribasic unsaturated fatty acids optionally mixed with monobasic unsaturated fatty acids, such as oleic acid; terephthalic acid dimethyl ester and terephthalic acid-bis-glycol ester.

Any suitable polyhydric alcohol may be used in preparing the polyester polyols. The polyols may be aliphatic, cycloaliphatic, aromatic and/or heterocyclic, and are preferably selected from the group consisting of diols and triols. Low molecular weight polyols such as aliphatic dihydric alcohols having from 2 to 16 carbon atoms are highly satisfactory. The polyols optionally may include substituents which are inert in the reaction, for example, chlorine and bromine substituents, and/or may be unsaturated. Suitable amino alcohols, such as, for example, monoethanolamine, diethanolamine, triethanolamine, or the like, may also be used Moreover, the polycarboxylic acid(s) may be condensed with a mixture of polyhydric alcohols and amino alcohols.

Examples of suitable polyhydric alcohols include: ethylene glycol; propylene glycol-(1,2) and -(1,3); butylene glycol-(1,4) and -(2,3); hexane diol-(1,6); octane diol-(1,8); neopentyl glycol; 1,4-bishydroxymethyl cyclohexane; 2-methyl-1,3-propane diol; glycerin; trimethylolpropane; trimethylolethane; hexane triol-(1,2,6); butane triol-(1,2,4); pentaerythritol; quinitol; mannitol; sorbitol; formitol; α-methyl-glucoside; diethylene glycol; triethylene glycol; tetraethylene glycol and higher polyethylene glycols; dipropylene glycol and higher polypropylene glycols as well as dibutylene glycol and higher polybutylene glycols. Especially suitable polyols are oxyalkylene glycols, such as diethylene glycol, dipropylene glycol, triethylene glycol, tripropylene glycol, tetraethylene glycol, tetrapropylene glycol, trimethylene glycol and tetramethylene glycol.

In a particularly preferred embodiment of the invention, the stabilized polyol blend contains an aromatic polyester polyol. The aromatic polyester polyols advantageously contain at least two hydroxyl groups and generally have a molecular weight of from about 150 to 5,000. Preferably, these polyesters contain from 2 to 8 hydroxyl groups and have a molecular weight of from about 220 to 800, more preferably from about 270 to 450. The acid component of these polyesters preferably comprises at least 40% by weight of phthalic acid residues. By phthalic acid residue is meant the group

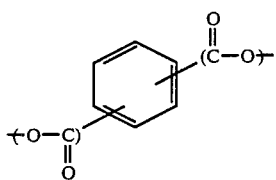

Particularly suitable compositions containing phthalic acid residues for use in the invention are (a) ester-containing by-products from the manufacture of dimethyl terephthalate, (b) scrap polyalkylene terephthalates, and (c) phthalic anhydride residues.

The preferred aromatic polyester polyols of the invention include, for example, reaction products of polyhydric, preferably dihydric and optionally trihydric and higher functionality alcohols with phthalic acids and other polybasic, preferably dibasic, carboxylic acids. Instead of using the free phthalic acids or polycarboxylic acids, the corresponding acid anhydrides or corresponding acid esters of lower alcohols or mixtures thereof may be used for preparing the polyesters. O-phthalic acids, isophthalic acids and/or terephthalic acids may be used as the phthalic acid. The polyhydric alcohols and the optional polybasic-carboxylic acids may be any of those referred to above as suitable for the preparation of the polyester polyols of the invention. The aromatic polyester polyols preferably should contain a sufficient amount of the above-defined phthalic acid residues for enhanced properties, especially reduced flammability, of the foams produced with the blend.

While the polyester polyols can be prepared from substantially pure reactant materials, more complex ingredients may be used, such as side-stream, waste or scrap residues from the manufacture of phthalic acid, terephthalic acid, dimethyl terephthalate (DMT), polyethylene terephthaacid, late (PET), adipic acid and the like. Suitable polyol side-stream sources include ethylene glycol, diethylene glycol, di- and triethylene glycol and higher homologs. The similar homologous series of propylene glycols can also be used. Polyester polyols derived from raw materials containing compounds having the above defined phthalic acid residues constitute a preferred component of the stabilized blends of the invention.

In a preferred embodiment of the invention, the polyester polyols contain about 0 to 35% excess unreacted polyol starting material and have an acid number less than 10. These polyester polyols advantageously comprise (a) about 65 to 100%, preferably 85 to 100%, by weight, of polyester polyol (especially aromatic polyester polyol), (b) about 0 to 35%, preferably 0 to 15%, by weight, of an alkylene glycol having the formula

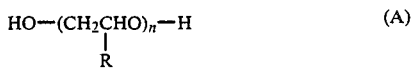

where R is hydrogen or lower alkyl of one to four carbon atoms and n is from 1 to 10, preferably 1 to 3, and more preferably 2 to 3, and (c) about 0 to 35%, preferably 0 to 15%, by weight, of at least one other polyol (e.g., a polyol of functionality greater than 2).

Alkylene glycols of formula (A) are especially useful in the transesterification and digestion of dimethyl terephthalate residues, PET scrap, phthalic anhydride bottoms, crude or light ends compositions, and the like. Additional glycol may be added after the transesterification and digestion procedures for appropriate adjustment of the equivalent weight. Examples of the alkylene glycols are ethylene glycol, propylene glycol, diethylene glycol, dipropylene glycol, triethylene glycol, tripropylene glycol and tetrapropylene glycol, among others, and mixtures thereof. Especially suitable glycols are diethylene and triethylene glycols. The term "polyester polyol" as used in this specification and claims thus includes any minor amounts of unreacted polyol remaining after the preparation of the polyester polyol and/or unesterified polyol added after the preparation.

Other polyols which can be employed in the stabilized polyol blend of the invention include, besides monomeric polyols, polyether polyols other than those included under above formula (A). These other polyether polyols are found particularly useful in preparing rigid polyurethane foams. Polyether polyols of this type are the reaction products of a polyfunctional active hydrogen initiator and a monomeric unit such as ethylene oxide, propylene oxide, butylene oxide and mixtures thereof, preferably propylene oxide, ethylene oxide or mixed propylene oxide and ethylene oxide. The polyfunctional active hydrogen initiator preferably has a functionality of 2–8, and more preferably has a functionality of 3 or greater (e.g., 3–8).

A wide variety of initiators may be alkoxylated to form useful polyether polyols. Thus, for example, polyfunctional amines and alcohols of the following type may be alkoxylated: monoethanolamine, diethanolamine, triethanolamine, ethylene glycol, polyethylene glycol, propylene glycol, hexanetriol, polypropylene glycol, glycerine, sorbitol, trimethylolpropane, pentaerythritol, sucrose and other carbohydrates. Such amines or alcohols may be reacted with the alkylene oxide(s) using techniques known to those skilled in the art. The hydroxyl number which is desired for the finished polyol would determine the amount of alkylene oxide used to react with the initiator. The polyether polyol may be prepared by reacting the initiator with a single alkylene oxide, or with two or more alkylene oxides added sequentially to give a block polymer chain or at once to achieve a random distribution of such alkylene oxides. The polyether polyols generally have an average equivalent weight from about 80 to 10,000 and preferably have an average equivalent weight from about 100 to about 6000. Polyoxypropylene glycols having molecular weights from about 200 to about 4000 corresponding to equivalent weights from about 100 to 2000 and mixture thereof are particularly useful as polyol reactants. Polyol blends such as a mixture of high molecular weight polyether polyols with lower molecular weight polyether polyols can also be employed.

A preferred hydroxy terminated aromatic polyester for use in the present invention is prepared by the transesterification, with a glycol of molecular weight from about 60 to about 400, of a residue remaining after dimethyl terephthalate and methyl p-toluate have been removed from a dimethyl terephthalate esterified oxidate reaction product, the major portion of said residue comprising a mixture of methyl and benzyl esters of benzene and biphenyl di- and tricarboxylic acids. This residue is described in U.S. Pat. No. 3,647,759, and suitable transesterified polyol mixtures are described in U.S. Pat. No. 4,237,238, the disclosures of which patents are hereby incorporated by reference. Two preferred transesterifying glycols which can be reacted with the residue are ethylene glycol and diethylene glycol, with the latter being more preferred. Examples of transesterified residues which can be used in accordance with the invention are those supplied by Hercules, Inc., Wilmington, Delaware under the trade name of Terate resins and those supplied by Jim Walter Resources, Inc. under the trademark Foamol.

An excess of the transesterifying glycol advantageously may be used to react with the residue defined above. The amount of this preferred excess of transesterifying glycol remaining in the transesterified polyol mixture can vary broadly but suitably falls within a range of from about 5 to about 30 percent by weight of said polyol mixture.

Another preferred aromatic polyester polyol which can be employed is prepared by the transesterification, with a glycol of molecular weight from about 60 to 400, of a by-product fraction from the manufacture of dimethyl terephthalate, the major portion of said fraction comprising about 15 to 70 weight percent of dimethyl terephthalate, and about 85 to 30 weight percent of a mixture of monomethyl terephthalate, bi-ring esters and polymeric materials. An expecially useful polyol mixture can be prepared by transesterifying a by-product fraction from the manufacture of dimethyl terephthalate comprising a mixture of:

(a) about 40 to 60 percent by weight of dimethyl terephthalate, (b) about 1 to 10 percent by weight of monomethyl terephthalate, (c) about 1 to 2 percent by weight of terephthalic acid, (d) about 10 to 25 percent by weight of bi-ring esters, (e) about 5 to 12 percent by weight of organic acid salts, (f) about 18 to 25 percent by weight of polymeric materials, and (g) about 1 to 4 percent by weight of ash.

An excess of the transesterifying glycol is advantageously used to react with the by-product fraction. Two preferred glycols for transesterifying the by-product fraction are ethylene glycol and diethylene glycol, with the latter being more preferred. The properties of the polyol mixture produced by the transesterification are described in U.S. Pat. No. 4,411,949, the disclosure of which is hereby incorporated by reference.

Still other preferred aromatic polyester polyols are those produced by digesting polyalkylene terephthalate, especially polyethylene terephthalate (PET), residues or scraps with organic polyols, such as the digestion products disclosed in U.S. Pat. Nos. 4,223,068, 4,417,001, 4,469,824, 4,529,744 and 4,604,410 and European Patent Applications Nos. 83102510.1 and 84304687.1.

Especially preferred are those polyols prepared by digesting polyalkylene terephthalate polymers with a polycarboxylic acid component-containing polyol derived from a digesting polycarboxylic acid component and a digesting polyol component. Advantageously, the polycarboxylic acid component has ring units with two

groups on adjacent (or ortho) or alternate (or meta) ring positions. Examples of suitable polycarboxylic acid components are phthalic anhydride, phthalic acid, isophthalic acid, trimellitic anhydride, trimellitic acid, benzophenonetetracarboxylic dianhydride, esters of these polycarboxylic acid components and mixtures thereof. Suitable digesting polyol components include glycols, such as diethylene glycol, dipropylene glycol, mixtures of these glycols and their mixtures with at least one other oxyalkylene glycol.

When PET is digested by the polycarboxylic acid component-containing polyol, it has been found advantageous to distill from the resultant digested polyol mixture sufficient ethylene glycol liberated in the digestion to improve the storage stability of the mixture. The polycarboxylic acid component-containing polyol preferably includes at least one glycol which is co-distillable with the liberated ethylene glycol, and the distillation is conducted to distill from the digested polyol mixture the amount of liberated ethylene glycol and co-distillable glycol sufficient for improved storage stability of the mixture. The distillation advantageously is conducted rapidly at reduced temperature and pressure to prevent or minimize the liberation of further ethylene glycol from the polyethylene terephthalate during the distillation. A most preferred distilled polyol mixture is prepared with a digesting medium derived from phthalic anhydride and diethylene glycol, and is characterized by an equivalent weight of 100-250 grams/equivalent of OH, a low free ethylene glycol content, e.g., less than 1%, preferably less than 0.5%, by weight, and a free diethylene glycol level in the 3 to 30 weight % range.

U.S. Pat. No. 4,539,341 and patent application Ser. No. 756,107 describe the preparation and properties of preferred digestion and distillation products obtained through use of the polycarboxylic acid component-containing digesting medium. The disclosures of this patent and application are hereby incorporated by reference.

Still another desirable aromatic polyester polyol is prepared by (a) transesterification, with the aforesaid polycarboxylic acid component-containing polyol, of the residue remaining after dimethyl terephthalate and methyl p-toluate have been removed from the product of oxidation of p-xylene in the preparation of dimethyl terephthalate, or (b) esterification, with the polycarboxylic acid component-containing polyol, of a carboxyl functional residue resulting from the removal of terephthalic acid from the mixture obtained by the oxidation of p-xylene in the preparation of terephthalic acid.

The preparation and properties of this polyester polyol are described in U.S. patent application No. 797,303, the disclosure of which is hereby incorporated by reference.

While any of the blowing agents generally employed in similar prior art foam products containing polyisocyanurate and/or polyurethane linkages may be employed, the singular finding of this invention is that premix compositions containing halogenated organic blowing agents, especially the chlorofluorocarbons, may be stabilized by use of small amounts of the stabilizing compound(s) described herein. The halogenated blowing agents can be any of those known to those skilled in the art as useful for blowing polymer mixtures into foams. In general, these blowing agents have an atmospheric pressure boiling point between minus 50° and 100° C. and preferably between zero and 50° C. Among such blowing agents are trichlorofluoromethane, dichlorodifluoromethane, monochlorodifluoromethane, monochlorotrifluoromethane, monochloropentafluoroethane, trichlorotrifluoroethanes, tetrachlorodifluoroethanes, and the like. The blowing agents are employed in an amount sufficient to give the resultant foam the desired bulk density which is generally between 0.5 and 10, and preferably between 1 and 5 pounds per cubic foot. The blowing agent generally comprises from about 1 to 50, and preferably comprises from about 30 to 50 weight percent of the stabilized polyol compositions. When the blowing agent has a boiling point at or below ambient, it is maintained under pressure until mixed with the other components. Alternatively, it can be maintained at subambient temperatures until mixed with the other components.

The stabilized polyol compositions of the invention also contain an amine catalyst. The tertiary amines of the invention are those which are usually employed to catalyze the reaction between an isocyanato group and an active hydrogen atom. Such catalysts are a group of compounds well recognized in the art of synthesizing polyurethanes; see, for example, Saunders et al., Polyurethanes, Chemistry and Technology, Part I, pages 228–230, Interscience Publishers, New York, 1964; see also Burkus, J., Journal of Organic Chemistry, 26, pages 779–782, 1961.

Suitable tertiary amines include, for example, aliphatic, cycloaliphatic, araliphatic and like tertiary amines. In general, the tertiary amines employed herein may be substituted by linear or branched, aliphatic, cycloaliphatic or araliphatic hydrocarbon radicals which may also contain hetero atoms such as oxygen, sulphur or nitrogen. Specific examples of substituents attached to the nitrogen atom of the tertiary amine include, for example, methyl, ethyl, propyl, butyl, hexyl, octyl, lauryl, stearyl, cyclohexyl, benzyl, isopropyl, propenyl, butene-2-yl, $CH_3—CH_2—S—CH_2—$, $CH_3—CH_2—O—CH_2—CH_2—$, $(CH_3)_2—N—CH_2—CH_2—$, and the like. Tertiary amines containing hydroxy groups as well as additional products of low or relatively high molecular weight obtained from primary and/or secondary monoamines or polyamines and alkyl oxides such as ethylene oxide, propylene oxide, 1,2- or 2,3-butylene oxide, styrene oxide, epichlorohydrin and the like may also be used. Illustrative examples of tertiary amines employable herein include triethylenediamine, triethylamine, dimethylbutylamine, dimethyl-(3-ethoxypropyl)amine, dimethylcyclohexyl amine, dimethylstearyl amine, diethylbutyl amine, tri-n-propyl amine, tri-n-butyl amine, tetramethylethylene diamine, tetramethyltetramethylene diamine, tetramethylhexylmethylene diamine, N,N,N'N'N''-pentamethyldipropylenetriamine, methyl morpholine, ethyl morpholine, dimorpholinodiethylether, dimethyl piperazine, N-methyl-N-(2-dimethylaminoethyl)-piperazine, pyridine, benzylpyridine, 1,3-bis(dimethylamino)-2propanol, dimethylethanolamine, 1,4-ethylenepiperidine, diethylethanolamine, N-methyl-diethanolamine, N-butyl-diethanolamine, triethanolamine, 2,4,6-tris(-dimethylaminomethyl)phenol, N,N',N''-tris-dimethylaminopropyl)-hexahydrotriazine, dimethylimidazole, and tetramethylene butanediamine.

Mixtures of the aforementioned and like amines are also contemplated herein. The amount of amine catalyst may be greatly varied but in general this catalyst will be employed in an amount between about 0.5 and 5% by weight, based on the weight of the stabilized polyol composition of the present invention. Other catalysts known to be useful for preparing the foams of the invention may be used in conjunction with the amine catalysts.

Any suitable surfactant can be employed in preparing the foams of this invention. The surfactant may be included in the stabilized polyol blend. Successful results have been obtained with silicone/ethylene oxide/propylene oxide copolymers as surfactants. Examples of surfactants useful in the present invention include, among others, polydimethylsiloxane-polyoxyalkylene block copolymers available from the Union Carbide Corporation under the trade names "L-5420" and "L-5340" and from the Dow Corning Corporation under the trade name "DC-193". Other suitable surfactants are those described in U.S. Pat. Nos. 4,365,024 and 4,529,745 and supplied by Jim Walter Resources, Inc. under the trademarks Foamstab 100 and 200. Generally, the surfactant comprises from about 1 to 15, and preferably from 2 to 10, weight percent of the stabilized polyol composition.

Minor amounts of other optional additives can be added to the stabilized blend composition of this invention or otherwise employed in producing foams. Such other additives include, for example, nonreactive and reactive flame retardants, such as tris (2-chloroethyl)-phosphate, dispersing agents, additional stabilizing agents, plasticizers, fillers and pigments.

The production of the stabilized polyol compositions can be by conventional methods such as by simply mixing the components in a suitable container.

The stabilized polyol blends of the present invention are used in the preparation of cellular polymers. The blends are particularly useful in the preparation of polyisocyanurate foams and polyurethane foams. These foams can be prepared by mixing together an organic polyisocyanate with the polyol, catalyst and blowing agent at temperatures ranging from about 10° C. to 150° C.

The polyurethane foams can be prepared by reacting the polyol—contained in the stabilized blend of the invention—and polyisocyanate on an essentially 1:1 to 1:1.2 equivalent basis. The polyisocyanurate foams of the invention are prepared by reacting the polyisocyanate with a minor amount of the polyol—contained in the stabilized blend—, such as sufficient polyol to provide about 0.10 to 0.95 hydroxyl equivalent of said polyol per equivalent of said polyisocyanate.

In the broadest aspects of the present invention, any organic polyisocyanate can be employed in the preparation of the foams of the present invention. The organic polyisocyanates which can be used include aromatic, aliphatic and cycloaliphatic polyisocyanates and combinations thereof. Representative of these types are the diisocyanates such as m-phenylene diisocyanate, toluene-2, 4-diisocyanate, toluene-2,6-diisocyanate, mixtures of 2,4- and 2,6-toluene diisocyanate, hexamethylene-1,6-diisocyanate, tetramethylene-1, 4-diisocyanate, cyclohexane-1,4-diisocyanate, hexahydrotoluene 2,4- and 2,6-diisocyanate, naphthalene-1,5-diisocyanate, diphenyl methane-4,4'-diisocyanate, 4,4'- diphenylenediisocyanate, 3,3'-dimethoxy-4,4'-biphenyldiisocyanate, 3,3'-dimethyl-4, 4,4'-diisocyanate; the triisocyanates such as 4,4',4"-triphenylmethanetriisocyanate, polymethylenepolyphenyl isocyanate, toluene-2,4,6-triisocyanate; and the tetraisocyanates such as 4,4'-dimethyldiphenylmethane-2,2',5,5'-tetraisocyanate. Especially useful are polymethylene polyphenyl polyisocyanates. These isocyanates are prepared by conventional methods known in the art such as the phosgenation of the corresponding organic amine.

In a preferred rigid foam of the invention, the organic polyisocyanate is a polymethylene polyphenylisocyanate having a functionality of at least 2.1 and preferably 2.5 to 3.2. These preferred polymethylene polyphenylisocyanates generally have an equivalent weight between 120 and 180 and preferably have an equivalent weight between 130 and 145. The friability of foams made with these polyisocyanates is desirably less than 20%, preferably less than 15%.

A preferred subclass of polymethylene polyphenylisocyanates especially useful in the present invention is a mixture of those of the following formula:

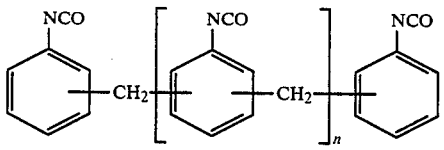

wherein n is an integer from 0 to 8 and wherein the mixture has the above-described functionality and equivalent weight. This mixture should have a viscosity (Brookfield) between 100 and 4,000 and preferably 250 to 2500 centipoises measured at 25° C. in order to be practical for use in the present invention.

Examples of suitable polymethylene polyphenylisocyanates useful in the present invention include those of the above formula, wherein n is 1 as well as mixtures wherein n can have any value from 0 to 8 as long as the mixture has the specified equivalent weight. One such mixture has 40 weight percent of n=0, 22 weight percent of n=1, 12 weight percent of n=2, and 26 weight percent of n=3 to about 8. The preferred polymethylene polyphenyl isocyanates are described in U.S. application Ser. No. 322,843, filed Jan. 11, 1973, now abandoned. The synthesis of polymethylene polyphenylisocyanates is described in Seeger et al., U.S. Pat. No. 2,683,730 and in Powers U.S. Pat. No. 3,526,652 at column 3, lines 6–21. It should, therefore, be understood that the polymethylene polyphenylisocyanates available on the market under the tradenames of CODE 047 or PAPI-20 (Upjohn) and MR 200 (Mobay) can successfully be employed within the spirit and scope of the present invention.

In order to ensure complete reaction of the isocyanurate foams, the polyisocyanate, preferably polymethylene polyphenylisocyanate, and the polyol are generally mixed in an equivalent ratio of 1.5:1 to 6:1 and preferably 2:1 to 5:1. In ranges outside these proportions the reaction tends to yield a product having less desirable physical characteristics.

The present invention also provides a process for producing a laminate which comprises (a) contacting at least one facing sheet with a foam-forming mixture comprising an organic polyisocyanate and the stabilized polyol composition, and (b) foaming the foam-forming mixture. The foam-forming mixture is conveniently thermally cured at a temperature from about 20° C. to 150° C. in a suitable apparatus, such as an oven or heated mold.

Any facing sheet previously employed to produce building panels can be employed in the present invention. Examples of suitable facing sheets include, among others, those of kraft paper, aluminum, and asphalt impregnated felts, as well as laminates of two or more of the above.

The foam materials of the invention can also be used, with or without a facer(s), for pipe insulation.

The foam materials of the invention can contain various reinforcement materials, such as a quantity of glass fibers, as described in U.S. Pat. Nos. 4,118,533 and 4,284,683, the disclosures of which are hereby incorporated by reference. The invention is further illustrated by the following examples in which all parts and percentages are by weight unless otherwise indicated. In the specification and claims, the following definitions apply:

CREAM TIME: the time interval beginning with the combination of the A and B components and ending when the composition changes color from dark brown to cream colored. This color change is also accompanied by a simultaneous increase in volume. Unless otherwise indicated, the reactants are mixed under ambient conditions of atmospheric pressure and room temperature (25° C.).

GEL TIME: the time interval beginning with the combination of the A and B components and ending with the gel point when a self-supporting, almost firm cellular plastic forms. The gel point is the moment when the polymer growth has reached sufficient size to change the foaming mass from a liquid to a solid.

FIRM TIME: the time interval between the combination of the A and B components and the firm point. Firm time is measured by periodically pressing by hand the top of the rising foam with a tongue depressor (a stick approximately 6 inches × ¾ inch × 1/16 inch). When the tongue depressor no longer penetrates the surface, the time is noted. The elasped time from addition of catalyst to this point is termed the firm time.

TACK FREE TIME: the time interval between the combination of the A and B components and the point when the foam surface is tack free. This is the point when the foam surface is sufficiently cured so that it does not adhere to a tongue depressor.

EXAMPLE 1

This example illustrates the use of stabilized polyol blends of the invention in the preparation of rigid polyurethane foams.

The foam system shown in the following Table I was used to determine the effectiveness of various barium/cadmium (Ba/Cd) stabilizers in preventing the degradation in foam reaction profile which normally accompanies the use of unstabilized polyester polyol blends. The stabilized polyol blends were prepared by blending together the ingredients of the B-component in the parts by weight set forth in Table I. For comparison, control formulations of the B-component ingredients without stabilizer were also prepared. Samples of each B-component blend were aged in an accelerated test by placing each in a sealed glass high-pressure bottle for 10 days at 55° C., and each sample was cooled overnight to 25° C. before foaming. The test is intended to simulate six months' aging under ambient conditions (cf the above-mentioned publication entitled: "Reaction Instability of Rigid Foam Systems Containing Polyester Polyols" of D. T. DeGuiseppi). Both the freshly prepared and aged blends were reacted with the polyisocyanate in hand-mixed polyurethane foam preparations and their reactivity was determined by observing the foam rise profile times.

The reported foam results and presence of any solids in the B-component after aging for each stabilized polyol blend and associated control are grouped together in Table II.

TABLE I
FOAM SYSTEM FOR EVALUATING STABILIZERS

| Component | Parts |
|---|---|
| A. Isocyanate[1] | 175 |
| B. Polyester Polyol[2] | 200 |
| Surfactant[3] | 2.5 |
| Catalyst[4] | (See below) |
| R-11B | 30 |
| Stabilizer | (See below) |

[1]Isocyanate = Mondur MR, a polymethylene polyphenyl isocyanate available from Mobay Chemical Corporation.
[2]Polyester Polyol = reaction product of dimethyl terephthalate bottoms and diethylene glycol having an equivalent weight of 180 and containing 14–18% diethylene glycol.
[3]Surfactant = DC-193, a silicone surfactant available from the Dow Corning Corporation.
[4]Catalyst = Polycat 8, an amine catalyst supplied by Abbott Laboratories, and used at a level of 1.2 parts by weight in Example 1.

TABLE II
EVALUATION OF STABILIZERS[1] IN POLYURETHANE FOAMS

| B-COMPONENT | | FOAM REACTION PROFILE, sec | | | | | |
|---|---|---|---|---|---|---|---|
| Stabilizer | Solids Formation | Age | Cream | Gel | Firm | Tack Free | % Δ Gel |
| None | | Initial | 29 | 46 | 48 | 58 | |
| None | None | Aged | 39 | 61 | 68 | 80 | 35 |
| Nuostabe V-1917[2] | | Initial | 27 | 42 | 47 | 52 | |
| Nuostabe V-1917[2] | None | Aged | 28 | 42 | 45 | 50 | 0 |
| None | | Initial | 27 | 41 | 44 | 54 | |
| None | None | Aged | 37 | 55 | 61 | 73 | 38 |
| Therm-Chek 5918[3] | | Initial | 25 | 38 | 43 | 50 | |
| Therm-Chek 5918[3] | None | Aged | 34 | 49 | 55 | 63 | 29 |
| Therm-Chek 75001[4] | | Initial | 27 | 41 | 46 | 52 | |
| Therm-Chek 75001[4] | None | Aged | 36 | 52 | 59 | 70 | 27 |
| Therm-Chek 344[5] | | Initial | 23 | 37 | 41 | 47 | |
| Therm-Chek 344[5] | None | Aged | 33 | 47 | 52 | 59 | 27 |
| None | | Initial | 29 | 45 | 49 | 57 | |
| None | None | Aged | 37 | 60 | 65 | 81 | 33 |
| Ba/Cd complex[6] | | Initial | 23 | 39 | 43 | 51 | |
| Ba/Cd complex[6] | Slight | Aged | 26 | 42 | 46 | 54 | 8 |
| None | | Initial | 28 | 51 | 57 | 65 | |
| None | None | Aged | — | — | — | — | |
| Mark XI[7] | | Initial | 25 | 46 | 53 | 62 | |
| Mark XI[7] | Very Slight | Aged | 28 | 46 | 53 | 62 | 0 |
| None | | Initial | 32 | 68 | 80 | 110 | |
| None | None | Aged | 52 | 92 | 103 | 135 | 35 |
| Mark XI[7] | | Initial | 28 | 64 | 80 | 100 | |
| Mark XI[7] | Very slight | Aged | 32 | 68 | 80 | 95 | 6 |

[1]Added to B-component at 1% of polyol weight.
[2]Solid Ba/Cd complex obtained from Tenneco Inc.
[3]Liquid composition consisting of Ba nonyl phenate/Cd octoate with phosphite and solvent; obtained from Ferro Corp.
[4]Liquid composition consisting of Ba/Cd complex with phosphite; obtained from Ferro Corp.
[5]Solid calcium/zinc soap obtained from Ferro Corp.
[6]Mixture of 2 above + triisopropanol amine.
[7]Solid Ba/Cd laurate-stearate soap obtained from Argus Chemical Corp.

EXAMPLE 2

This example illustrates the effect of varying the concentration of stabilizer in the polyol blend on the initial foam reactivity profile.

Polyurethane foams were prepared from Mondur MR and freshly prepared B-component blends using the foam system and procedure of Example 1 and the stabilizer Mark XI in the concentrations set forth in the following Table III. The catalyst Polycat 8 was used in all but the last two blends of the table (at a level of 1.2 parts by weight).

The data presented in Table III demonstrate that the stabilizer gave little or no increase in initial foaming rate as its concentration was increased, and gave moderate 20%) increase in gel time in an uncatalytzed system.

TABLE III
CATALYTIC EFFECT OF STABILIZER ON INITIAL FOAM REACTIVITY PROFILE

| Stabilizer Concentration | INITIAL FOAM REACTION PROFILE, sec | | | | |
|---|---|---|---|---|---|
| | Cream | Gel | Firm | Tack Free | % Δ Gel |
| A. AMINE CATALYST PRESENT | | | | | |
| (% of polyol wt) | | | | | |
| None | 29 | 51 | 55 | 68 | — |
| .5% | 28 | 50 | 53 | 62 | −2 |
| 1.0% | 26 | 50 | 55 | 66 | −2 |
| 2.0% | 27 | 48 | 52 | 64 | −6 |
| B. AMINE CATALYST ABSENT | | | | | |
| None | 150 | 490 | 570 | 1230 | — |
| 1.0% | 150 | 390 | 450 | 1100 | −20 |

EXAMPLE 3

This example illustrates the use of polyol blends containing liquid stabilizers in the preparation of polyurethane foams.

Polyurethane foams were prepared from Mondur MR and freshly prepared B-component blends using the foam system and procedure of Example 1 and the liquid stabilizers in the concentrations set forth in the following Table IV. The catalyst Polycat 8 was used in each blend at a level of 1.2 parts by weight.

The reported results of Table IV illustrate that the Mark 7100 series of liquid stabilizers showed some catalytic activity. At high use levels, the stabilizer Mark 7178 gave fine celled foam while the other liquid stabilizers caused coarse cells in the foam.

TABLE IV
CATALYTIC EFFECT OF STABILIZERS ON INITIAL FOAM REACTIVITY PROFILE

| STABILIZER | | INITIAL FOAM REACTION PROFILE, sec | | | | | |
|---|---|---|---|---|---|---|---|
| Name | Concentration | Cream | Gel | Firm | Tack Free | % Δ Gel | Cell Quality |
| — | None | 30 | 60 | 72 | 85 | — | |
| Mark 7118[1] | 1% | 27 | 51 | 61 | 70 | −15 | |
| Mark 7118 | 5% | 14 | 25 | 32 | 42 | −58 | Coarse Cells |
| Mark 7119[2] | 1% | 24 | 52 | 62 | 70 | −13 | |
| Mark 7119 | 5% | 17 | 30 | 36 | 48 | −50 | Coarse Cells |
| Mark 7120[3] | 1% | 21 | 42 | 50 | 50 | −30 | |
| Mark 7120 | 5% | 8 | 10 | 18 | 22 | −83 | Coarse Cells |
| Mark 7178[4] | .5% | 30 | 54 | 63 | 73 | −10 | |
| Mark 7178 | 1.0% | 27 | 45 | 55 | 60 | −25 | |
| Mark 7178 | 2.0% | 18 | 34 | 42 | 48 | −43 | |
| Mark 7178 | 2.5% | 18 | 31 | 38 | 45 | −48 | Fine Cells |
| Mark 7178 | 5% | 10 | 20 | 26 | 30 | −66 | Fine Cells |

[1]Liquid barium-cadmium complex obtained from Argus Chemical Corp.
[2]Liquid barium-cadmium-zinc complex obtained from Argus Chemical Corp.
[3]Liquid barium-cadmium-zinc complex obtained from Argus Chemical Corp.
[4]Liquid overbased barium nonylphenate-cadmium 2-ethyl-hexanoate obtained from Argus Chemical Corp.

EXAMPLE 4

This example illustrates the use of freshly prepared and aged polyol blends containing liquid stabilizers in the preparation of polyurethane foams.

Polyurethane foams were prepared from Mondur MR and B-component blends using the foam system and procedure of Example 1 and the liquid stabilizers in the concentrations set forth in the following Table V. The catalyst Polycat 8 was used in all but the last two foam preparations of the table (at a level of 1.2 parts by weight).

The Table V results illustrate that, when aged at 55° C. for 10 days, all stabilized blends gave less loss of gel time than the control, with the overbased complex Mark 7178 at a 1% use level providing the best stabilization.

TABLE V
EVALUATION OF LIQUID STABILIZERS IN POLYURETHANE FOAMS

| STABILIZER | | | FOAM REACTION PROFILE, sec | | | | |
|---|---|---|---|---|---|---|---|
| Name | Concentration | Age | Cream | Gel | Firm | Tack Free | % Δ Gel |
| A. AMINE CATALYST PRESENT | | | | | | | |
| — | None | Initial | 30 | 60 | 72 | 85 | — |
| | None | Aged | 53 | 80 | 90 | 115 | 33 |
| Mark 7118[1] | 1% | Initial | 27 | 51 | 61 | 70 | — |
| " | 1% | Aged | 33 | 65 | 74 | 94 | 27 |
| Mark 7119[2] | 1% | Initial | 24 | 52 | 62 | 70 | — |
| " | 1% | Aged | 39 | 63 | 80 | 93 | 21 |
| Mark 7120[3] | 1% | Initial | 21 | 42 | 50 | 50 | — |
| " | 1% | Aged | 26 | 55 | 65 | 80 | 31 |
| Mark 7178[4] | .5% | Initial | 30 | 54 | 63 | 73 | — |
| " | .5% | Aged | 37 | 64 | 75 | 90 | 19 |
| Mark 7178 | 1% | Initial | 27 | 45 | 55 | 60 | — |
| " | 1% | Aged | 28 | 49 | 57 | 65 | 9 |
| B. AMINE CATALYST ABSENT | | | | | | | |
| Mark 7178 | 1% | Initial | 110 | 210 | 240 | 330 | — |
| " | 1% | Aged | 90 | 200 | 240 | — | — |

[1]Liquid barium-cadmium complex obtained from Argus Chemical Corp.
[2]Liquid barium-cadmium-zinc complex obtained from Argus Chemical Corp.
[3]Liquid barium-cadmium-zinc complex obtained from Argus Chemical Corp.
[4]Liquid overbased barium nonylphenate-cadmium 2-ethyl-hexanoate obtained from Argus Chemical Corp.

EXAMPLE 5

This example illustrates the effect of using different amine catalysts in combination with a liquid stabilizer in the preparation of polyurethane foams.

Polyurethane foams were prepared from Mondur MR and B-component blends using the foam system and procedure of Example 1. The stabilized polyol blends contained 2 parts of the liquid stabilizer MARK 7178. The amine catalysts employed and the concentrations thereof are set forth in the following Table VI.

The Table VI results show that relatively stable polyol blends are provided by the liquid stabilizer regardless of which amine catalyst is used.

TABLE VI
EVALUATION OF LIQUID STABILIZER WITH VARIOUS CATALYSTS IN POLYURETHANE FOAMS

| STABILIZER | CATALYST | | FOAM REACTION PROFILE, sec | | | | |
|---|---|---|---|---|---|---|---|
| | Name | Concentration, Parts | Age | Cream | Gel | Firm | Tack Free | % Δ Gel |
| None | DMP-30[1] | 3.0 | Initial | 26 | 57 | 70 | 75 | |
| " | " | " | Aged | 38 | 71 | 95 | 110 | 25 |
| Mark 7178 | " | " | Aged | 27 | 57 | 67 | 75 | 0 |
| None | Triethylamine | 1.3 | Initial | 26 | 57 | 70 | 80 | |
| " | " | " | Aged | 38 | 69 | 81 | 95 | 21 |
| Mark 7178 | " | " | Aged | 27 | 52 | 63 | 72 | −9 |
| None | Polycat-41[2] | 1.5 | Initial | 28 | 63 | 70 | 96 | |
| " | " | " | Aged | 53 | 80 | 92 | 110 | 27 |
| Mark 7178 | " | " | Aged | 33 | 62 | 73 | 84 | −2 |

[1]Amine catalyst supplied by the Rohm & Haas Chemical Co.
[2]Amine catalyst supplied by Abbott Laboratories.

EXAMPLE 6

This example illustrates the use of another liquid overbased barium salt complex as stabilizer in the preparation of polyurethane foams.

Polyurethane foams were prepared from Mondur MR and B-component blends using the foam system and procedure of Example 1. The stabilized polyol blend contained 2 parts of the liquid overbased barium salt complex shown in the following Table VII. The catalyst Polycat 8 was used in each foam preparation at a level of 1.2 parts by weight.

The Table VII results demonstrate that the reactivity of the premix is preserved by use of the overbased organometallic salt.

TABLE VII

EVALUATION OF OVERBASED LIQUID STABILIZER IN POLYURETHANE FOAMS

| B-COMPONENT STABILIZER | Age | FOAM REACTION PROFILE, sec | | | | % Δ Gel |
| --- | --- | --- | --- | --- | --- | --- |
| | | Cream | Gel | Firm | Tack Free | |
| None | Initial | 40 | 60 | 73 | 95 | |
| " | Aged | 75 | 133 | 145 | — | 122 |
| Mark 4086* | Initial | 33 | 53 | 58 | 68 | |
| " | Aged | 32 | 53 | 63 | 80 | 0 |

*Overbased barium carboxylate obtained from Argus Chemical Corp.

EXAMPLE 7

This example illustrates the synthesis of polyurethane foams utilizing a stabilized and unstabilized polyol blend.

In the preparation of the foams, the following quantities of the ingredients listed in the following Table VIII were combined as follows. Each foam was prepared by first mixing together the B-component ingredients to form a blend, and the resulting blend was admixed with Mondur MR for 15 seconds at 2500 rpm and 25° C. to form a polyurethane foam having the characteristics shown in Table VIII.

TABLE VIII

FOAM EVALUATION OF POLYOL BLENDS

| INGREDIENT (pts. by wt.) | TYPE | SUP-PLIER | FOAM 1 | FOAM 2 |
| --- | --- | --- | --- | --- |
| A-Component | | | | |
| Mondur MR | ISOCYANATE | Mobay | 228 | 228 |
| B-Component | | | | |
| Poly G 71-530 | Polyether Polyol | Olin | 42.25 | 42.25 |
| Voranol 800 | Polyether Polyol | Dow | 32.45 | 32.45 |
| Terate 203 | Polyester Polyol | Hercules | 89.70 | 89.70 |
| Fyrol 6 | Flame Retardant | Stauffer | 15.00 | 15.00 |
| DC-193 | Surfactant | Dow Corning | 3.50 | 3.50 |
| Polycat 8 | Catalyst | Abbott | 0.20 | 0.20 |
| Mark 7178 | Stabilizer | Argus | 0.90 | — |
| R-11 B | Blowing Agent | Pennwalt | 66.70 | 66.70 |
| FOAM PROPERTIES | | | | |
| Cream time, sec | | | 22 | 24 |
| Gel time, sec | | | 60 | 60 |
| Firm time, sec | | | 72 | 74 |
| Tack Free Time, sec | | | 95 | 105 |
| k Factor, Initial | | | .123 | .124 |
| % Closed Cells | | | 88 | 85 |
| Friability, % wt. los | | | <1 | <1 |
| Dimensional Stability 28 days, 70° C./95% R.H. % Volume Change | | | 21 | 23 |

We claim:

1. A storage-stable premix composition for use in a foam-forming reaction with an organic polyisocyanate in the manufacture of a polyurethane or polyisocyanurate foam comprising
   (a) at least one polyol,
   (b) at least one halogenated organic blowing agent,
   (c) at least one amine catalyst, and
   (d) a stabilizing amount of at least one polyvalent metal-containing organometallic compound, provided that, when the organometallic compound is added, at a level of about 1000 ppm metal, based on parts of polyester polyol, to a "B" component specially formulated for use in producing a model foam and the "B" component is then reacted with a polymethylene polyphenylisocyanate to produce a foam, the initial gel time of the resultant foam is at least about 60% of the initial gel time of the model foam which is prepared, without addition of the organometallic compound, by reaction of
   (1) the specially formulated "B" component which comprises
      (i) 100 parts of a polyester polyol,
      (ii) 1.5 parts of a silicone surfactant,
      (iii) sufficient amine catalyst to provide a 40–60 second initial gel time,
      (iv) 15.0 parts of freon-11 and
      (v) 0.1 part of α-methylstyrene, with
   (2) sufficient polymethylene polyphenylisocyanate to provide a 1.10 foam index.

2. The premix composition of claim 1 wherein the organic polyisocyanate comprises a polymethylene polyphenylisocyanate and the polyol comprises a polyester polyol.

3. The premix composition of claim 2 wherein the metal of the organometallic compound is from Group II or IIB of the Periodic Table.

4. The premix composition of claim 2 wherein the organometallic compound is a member selected from the group consisting of a carbonate, a salt of a carboxylic acid, a salt of a hydrocarbon-substituted phenol and mixtures thereof.

5. The premix composition of claim 4 wherein the polyvalent metal of the organometallic compound is a member selected from the group consisting of barium, cadmium and mixtures thereof.

6. The premix composition of claim 4 wherein the organometallic compound comprises an overbased barium salt complex wherein the number of metal equivalents is greater than the number of equivalents of acid residue.

7. The premix composition of claim 2 wherein the polyester polyol comprises an aromatic polyester polyol having a hydroxyl number of about 100 to 700.

8. The premix composition of claim 7 wherein the blowing agent is a chlorofluorocarbon, the organometallic compound is a member selected from the group consisting of a carbonate, a salt of a carboxylic acid, a salt of a hydrocarbon-substituted phenol and mixtures thereof, and the polyvalent metal of the organometallic compound is a member selected from the group consisting of barium, cadmium and mixtures thereof.

9. The premix composition of claim 8 wherein the organometallic compound is a member selected from the group consisting of overbased barium carboxylate, overbased barium nonylphenate-cadmium 2-ethyl hexanoate, and mixtures thereof.

10. The premix composition of claim 7 wherein the aromatic polyester polyol comprises the reaction product of at least one polyol and at least one coreactant selected from the group consisting of (a) ester-containing by-products from the manufacture of dimethyl terephthalate, (b) scrap polyalkylene terephthalates, (c) phthalic anhydride residues, and (d) mixtures thereof.

11. The premix composition of claim 10 wherein the blowing agent is a chlorofluorocarbon, the organometallic compound is a member selected from the group consisting of a carbonate, a salt of a carboxylic acid, a salt of a hydrocarbon-substituted phenol and mixtures thereof, and the polyvalent metal of the organometallic compound is a member selected from the group consisting of barium, cadmium and mixtures thereof.

12. The premix composition of claim 11 wherein the organometallic compound is a member selected from the group consisting of overbased barium carboxylate, overbased barium nonylphenate-cadmium 2-ethyl hexanoate, and mixtures thereof.

13. The premix composition of claim 7 wherein the aromatic polyester polyol comprises
 (a) about 65 to 100% by weight of polyester polyol,
 (b) about 0 to 35% by weight of an alkylene glycol having the formula

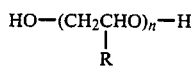

wherein R is a member selected from the group consisting of hydrogen and lower alkyl of one to four carbon atoms and n is from 1 to 10, and
 (c) about 0 to 35% by weight of at least one other polyol.

14. The premix composition of claim 13 wherein the blowing agent is a chlorofluorocarbon, the organometallic compound is a member selected from the group consisting of a carbonate, a salt of a carboxylic acid, a salt of a hydrocarbon-substituted phenol and mixtures thereof, and the polyvalent metal of the organometallic compound is a member selected from the group consisting of barium, cadmium and mixtures thereof.

15. The premix composition of claim 14 wherein the organometallic compound is a member selected from the group consisting of overbased barium carboxylate, overbased barium nonylphenate-cadmium 2-ethyl hexanoate, and mixtures thereof.

16. In a process for the production of a polyurethane or polyisocyanurate foam wherein an organic polyisocyanate is reacted with a premix composition comprising (a) at least one polyol, (b) at least one halogenated organic blowing agent and (c) at least one amine catalyst, the improvement comprising including in the premix composition as stabilizer the polyvalent metal-containing organometallic compound of claim 1.

17. The process of claim 16 wherein the organic polyisocyanate comprises a polymethylene polyphenylisocyanate, the polyol comprises a polyester polyol and the blowing agent comprises a chlorofluorocarbon.

18. The process of claim 17 wherein the organometallic compound is a member selected from the group consisting of a carbonate, a salt of a carboxylic acid, a salt of a hydrocarbon-substituted phenol and mixtures thereof, and the polyvalent metal of the organometallic compound is a member selected from the group consisting of barium, cadmium and mixtures thereof.

19. In a process for the production of a laminate which comprises (a) contacting at least one facing sheet with a foam-forming mixture comprising an organic polyisocyanate and a premix composition comprising (1) at least one polyol, (2) at least one halogenated organic blowing agent and (3) at least one amine catalyst, and (b) foaming the foam-forming mixture, the improvement comprising including in the premix composition as stabilizer the polyvalent metal-containing organometallic compound of claim 1.

20. The process of claim 19 wherein the organic polyisocyanate comprises a polymethylene polyphenylisocyanate, the polyol comprises a polyester polyol, the blowing agent comprises a chlorofluorocarbon, the organometallic compound is a member selected from the group consisting of a carbonate, a salt of a carboxylic acid, a salt of a hydrocarbon-substituted phenol and mixtures thereof, and the polyvalent metal of the organometallic compound is a member selected from the group consisting of barium, cadmium and mixtures thereof.

21. The premix composition of claim 1 which additionally contains an additive selected from the group consisting of an additional blowing agent, a flame retardant, a dispersing agent, an additional stabilizing agent, a plasticizer, a filler, a pigment, a surfactant and mixtures thereof.

22. The premix composition of claim 8 which additionally contains an additive selected from the group consisting of an additional blowing agent, a flame retardant, a dispersing agent, an additional stabilizing agent, a plasticizer, a filler, a pigment, a surfactant and mixtures thereof.

23. The premix composition of claim 9 which additionally contains an additive selected from the group consisting of an additional blowing agent, a flame retardant, a dispersing agent, an additional stabilizing agent, a plasticizer, a filler, a pigment, a surfactant and mixtures thereof.

* * * * *